United States Patent
Blanchard et al.

(10) Patent No.: US 12,315,261 B1
(45) Date of Patent: May 27, 2025

(54) SYSTEM AND METHOD FOR AUTOMATED DETECTION OF LANDFILL CHANGES

(71) Applicant: WM Intellectual Property Holdings, L.L.C., Houston, TX (US)

(72) Inventors: Kendric Blanchard, Denver, CO (US); Jodi Blomberg, Denver, CO (US); Jiucai Zhang, Denver, CO (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/381,138

(22) Filed: Oct. 17, 2023

Related U.S. Application Data

(60) Provisional application No. 63/416,864, filed on Oct. 17, 2022.

(51) Int. Cl.
| | |
|---|---|
| G06V 20/17 | (2022.01) |
| G06F 16/29 | (2019.01) |
| G06F 16/51 | (2019.01) |
| G06T 7/12 | (2017.01) |
| G06T 7/80 | (2017.01) |
| G06V 10/24 | (2022.01) |
| G06V 20/40 | (2022.01) |
| G06V 20/52 | (2022.01) |

(52) U.S. Cl.
CPC ............ *G06V 20/52* (2022.01); *G06T 7/12* (2017.01); *G06T 7/80* (2017.01); *G06V 10/24* (2022.01); *G06V 20/44* (2022.01)

(58) Field of Classification Search
CPC ........ G06V 20/52; G06V 10/24; G06V 20/44; G06T 7/80; G06T 7/12
See application file for complete search history.

(56) References Cited

U.S. PATENT DOCUMENTS

| | | | | |
|---|---|---|---|---|
| 5,187,754 A | * | 2/1993 | Currin | G06V 10/24 |
| | | | | 382/268 |
| 5,379,215 A | * | 1/1995 | Kruhoeffer | G01S 13/955 |
| | | | | 702/3 |
| 8,811,811 B1 | * | 8/2014 | Wetzel | H04N 13/243 |
| | | | | 396/322 |
| 9,098,747 B1 | * | 8/2015 | Stewart | G06V 20/182 |

(Continued)

FOREIGN PATENT DOCUMENTS

| | | | | |
|---|---|---|---|---|
| CN | 107421514 A | * | 12/2017 | ............ G01C 15/00 |
| JP | H11192466 A | * | 1/1998 | |
| WO | WO-2024042508 | * | 6/2023 | |

OTHER PUBLICATIONS

Wei, Jin-zhan translation of CN 107421514 A Jun. 21, 2017 (Year: 2017).*

(Continued)

*Primary Examiner* — Zaihan Jiang
(74) *Attorney, Agent, or Firm* — Greenberg Traurig LLP

(57) ABSTRACT

A system and method for monitoring and controlling of landfill operations are provided. One or more cameras are mounted on satellites, drones, and other devices to capture images and video of a landfill site from an aerial view. Users can analyze these images over time to automatically detect and classify material changes in landfill cover type and integrity, as well as human activities, and further associate these activities with environmental issues and land uses, helping to identify their root causes.

9 Claims, 6 Drawing Sheets

(56) References Cited

U.S. PATENT DOCUMENTS

| | | | | |
|---|---|---|---|---|
| 2012/0075338 A1* | 3/2012 | Curtis | ................... | H04W 4/021 |
| | | | | 709/204 |
| 2013/0084838 A1* | 4/2013 | Smith | .................... | G01C 21/20 |
| | | | | 455/414.2 |
| 2014/0316616 A1* | 10/2014 | Kugelmass | .............. | G08G 5/26 |
| | | | | 701/8 |
| 2016/0356610 A1* | 12/2016 | O'Beirne | ............ | G06F 3/04842 |
| 2016/0356624 A1* | 12/2016 | O'Beirne | ................ | G06T 11/60 |
| 2016/0356625 A1* | 12/2016 | O'Beirne | .............. | G09B 29/008 |
| 2019/0064851 A1* | 2/2019 | Tran | ........................ | G06N 3/045 |
| 2021/0334582 A1* | 10/2021 | Erez | .......................... | G06T 7/11 |
| 2022/0262406 A1* | 8/2022 | Daugherty | ............ | G11B 27/031 |

OTHER PUBLICATIONS

Hatsuta Akimichi translation of JP H11192466 A Jan. 6, 1998 (Year: 1998).*

* cited by examiner

SYSTEM AND METHOD FOR AUTOMATED DETECTION OF LANDFILL CHANGES

RELATED APPLICATIONS

This application claims the benefit, and priority benefit, of U.S. Provisional Patent Application Ser. No. 63/416,864, filed Oct. 17, 2022, the disclosure and contents of which are incorporated by reference herein in their entirety.

BACKGROUND

Field of the Invention

The presently disclosed subject matter relates to a system and method for monitoring and control of landfill operations.

Description of the Related Art

Existing technology and related literature predominantly focuses on the surveillance of environmental implications related to landfills, including concerns like water contamination and emissions of greenhouse gases. It also delves into issues such as spotting and tracing unauthorized waste disposal, monitoring the expansion of landfills, and evaluating transformations in land use with their associated ecological effects.

However, there is limited research that focuses on the automatic detection and classification of material changes in landfill cover types and integrity within landfill sites. Additionally, little attention has been given to the exploration of how various landfill characteristics and human activities in landfill evolve, and their impact on the environment and land use.

Improvements in this field of technology are therefore desired.

SUMMARY

In accordance with the presently disclosed subject matter, various illustrative embodiments of a system and method for monitoring and controlling of landfill operations are described herein.

In certain illustrative embodiments, a method of monitoring landfill operations at a landfill site is provided. A first set of images of the landfill site is obtained from at least one optical sensor, wherein the at least one optical sensor can comprise a camera located on a satellite or a drone. A second set of images of the landfill site is obtained from at least one optical sensor, wherein the at least one optical sensor can comprise a camera located on a satellite or a drone. The first set of images and the second set of images can be aligned. The first set of images can be segmented and sections of the segmented images can be categorized based on landfill characteristics. The second set of images can be segmented and sections of the segmented images can be categorized based on landfill characteristics. The segmented images can be merged, and a change map can be generated that identifies the location and nature of a change within the segmented images. The at least one optical sensor can comprise a camera located on a satellite, a drone, a vehicle, a robot, or a smartphone. Each image can comprise a plurality of image pixels, and the image pixels can be mapped to corresponding latitude and longitude geographical coordinates. The at least one optical sensor can be calibrated to correct distortion in the image and convert the image to corresponding coordinates. The change can comprise one or more of landfill construction and human activities, landfill cover, leachate seep, vegetation change, slope variation, and the presence of a gas well. An alert can be generated based upon detected landfill constructions and human activities.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for monitoring and controlling of landfill operations, and more particularly, for automated detection of landfill changes, are disclosed herein.

In certain illustrative embodiments, one or more cameras are mounted on satellites, drones, and other devices to capture images and video of a landfill site from an aerial view. Users are able to analyze these images and video over time to automatically detect and classify material changes in landfill cover type and integrity, as well as human activities, and further associate these activities with environmental issues and land uses, helping to identify their root causes.

In certain illustrative embodiments, the presently disclosed system employs a diverse range of camera technologies to monitor landfills comprehensively, utilizing various platforms, including satellites, drones, aircrafts and other devices. These cameras are configured to capture images and videos using both visible and non-visible light spectra. Depending on their unique characteristics, such as light type, wavelength, resolution, and viewing angle, the cameras can effectively monitor and detect different materials, landfill structures, and gases across different timeframes and spatial dimensions. This rich array of sensing modalities yields an abundance of high-resolution and varied data, significantly enhancing the system's capacity to identify diverse materials, landfill structure change, and gases under various weather conditions.

Moreover, the presently disclosed system is highly adaptable and can be customized to suit the specific size and duration of landfill coverage, providing both a broad overview and an in-depth analysis of landfill sites. Beyond the camera data from the single platform, the presently disclosed system seamlessly integrates data from different camera types and platforms, offering a holistic perspective that ranges from an aerial view via satellite imagery to a finely detailed inspection through drone-mounted cameras.

In certain illustrative embodiments, the presently disclosed system can extend its approach to cameras mounted on other devices, such as vehicles, robots, or smartphones. This capability allows the system to complement and supplement data obtained from satellites and drones. For example, vehicle-mounted cameras can create 3D models of landfill sites to monitor changes. Robot-mounted cameras can inspect the interiors and surfaces of landfills, while smartphone cameras can collect data for specific areas that require more attention. This versatility ensures that the system can provide comprehensive and integrated information for effective landfill monitoring, management, and construction monitoring.

Figure 1:
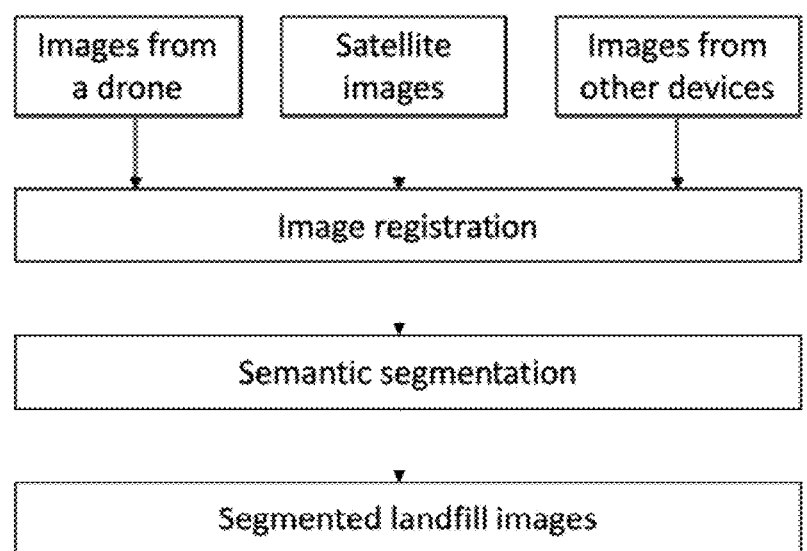
FIG. 1 is a segmentation model for monitoring and controlling of landfill operations according to embodiments of the present disclosure.
Figure 2:
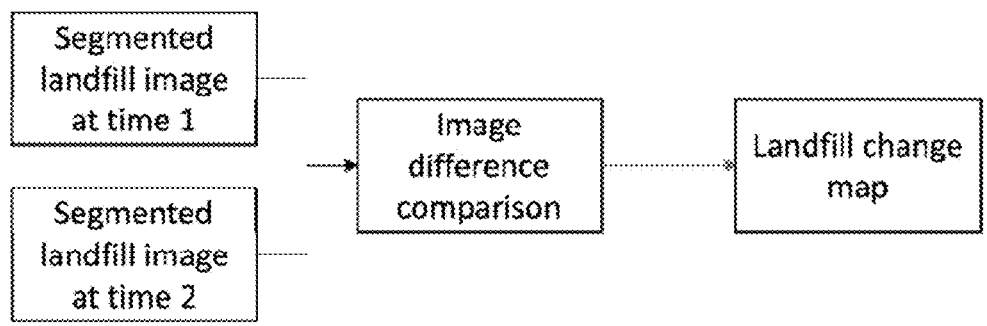
FIG. 2 is a change generation model for monitoring and controlling of landfill operations according to embodiments of the present disclosure.

In certain illustrative embodiments, a landfill monitoring method is provided that comprises two primary stages: an initial segmentation model and a subsequent change generation model. In the first stage, the segmentation model initially performs co-registration to align images obtained from different cameras and subsequently merges or fuses them to produce segmented landfill images, as illustrated in FIG. 1. As used herein, co-registration refers to a process by which different sets of data collected from different sources (sensors or modalities) are aligned into a common format to combine the information contained within each source. In the second stage, the change generation model compares the segmented landfill images to create a change map that identifies the location and nature of changes within the images, as depicted in FIG. 2.

Image Registration Model

In certain illustrative embodiments, the image registration model performs the mapping of image pixels to corresponding latitude and longitude geographical coordinates. This mapping process entails associating real-world reference coordinates with every pixel in the raster image, which is a rectangular array of regularly sampled pixels with each pixel having one or more number designations associated with it.

In the case of satellite imagery, these reference coordinates can be acquired by querying the satellite image provider using a defined polygon boundary with longitude and latitude coordinates. Once these reference coordinates are established, transformation models like polynomial or affine transformations are employed to convert pixel coordinates into geographic coordinates. Furthermore, image rectification can be applied to the original image to ensure precise alignment with the chosen geographic coordinate system. The application of a map projection can also be used to maintain the accuracy of the georeferenced data.

For drone-captured images, the reference coordinate corresponds to the longitude and latitude of the image's capture location. The process also involves camera calibration to correct distortions in the image and convert it to real-world coordinates. This calibration can ensure accurate measurements and effective mapping.

Semantic Segmentation Model

Figure 3:
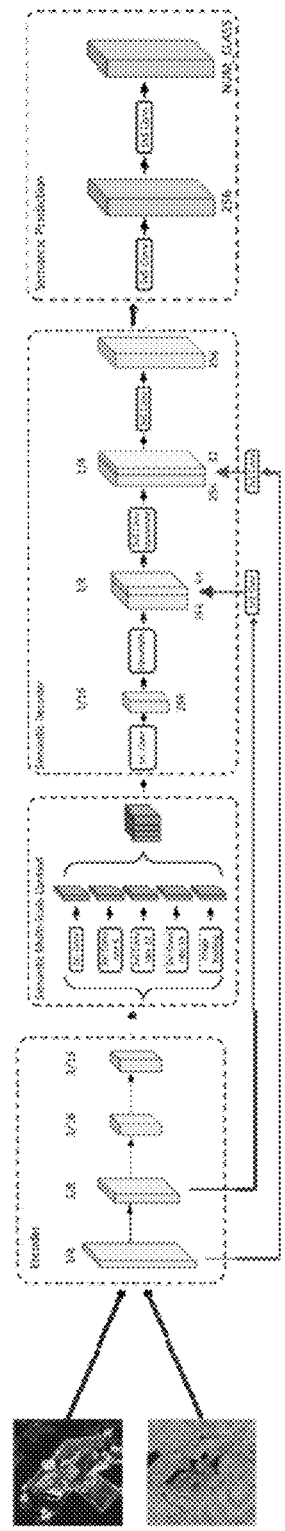
FIG. 3 is a semantic segmentation model architecture according to embodiments of the present disclosure.

In certain illustrative embodiments, semantic segmentation models, whether supervised or unsupervised, can be used for assigning labels to individual pixels within an image. The formulation of a semantic segmentation model hinges upon a range of factors, including the spectral characteristics of the camera, the quantity, angles, resolutions of cameras, and the underlying platform. In the supervised paradigm, the model adheres to an encoder-decoder architecture. Encoders leverage convolutional neural networks (CNNs) for the extraction of pertinent image features, while decoders generate the final segmentation maps. In this design, the encoder's backbone is derived from a neural network pre-trained on an image database such as ImageNet™. The inclusion of atrous convolutions aids in the extraction of denser feature maps. For effective semantic segmentation, the decoder seamlessly combines the Atrous Spatial Pyramid Pooling (ASPP) module with the up-sampling module. The model can process inputs, either as single co-registered and calibrated images from a specific system or concatenated images from multiple platforms as shown in FIG. 3. The output is the pixel-wise labeling of each latitude and longitude coordinate within the mapped geographical reference. These labels encompass various attributes, such as landfill characteristics, material types, and construction details. These models can be trained in an end-to-end way.

In certain illustrative embodiments, the presently disclosed system and method can also accommodate unsupervised semantic segmentation, encompassing edge-based, region-based, and clustering-based approaches. These techniques do not necessitate labeled data and can be readily applied to raw satellite images. Since unsupervised models are acutely sensitive to features, a thoughtful approach to feature selection is necessary. Multiband images may be fed into a neural network to derive image embeddings. By a combination of diverse bands from the satellite image, novel features can be generated. The assignment of distinct importance weights to various bands is an additional strategy for creating new features. For instance, employing the K-Means method can cluster pixels of the same material type together. In this context, the near-infrared band is typically the primary feature, ensuring consistency within material types. For improved material differentiation and segmentation, the integration of red, green, and blue band images can be introduced, effectively addressing challenges like distinguishing temporary cover from water ponds.

Change Detection Model

Figure 4:
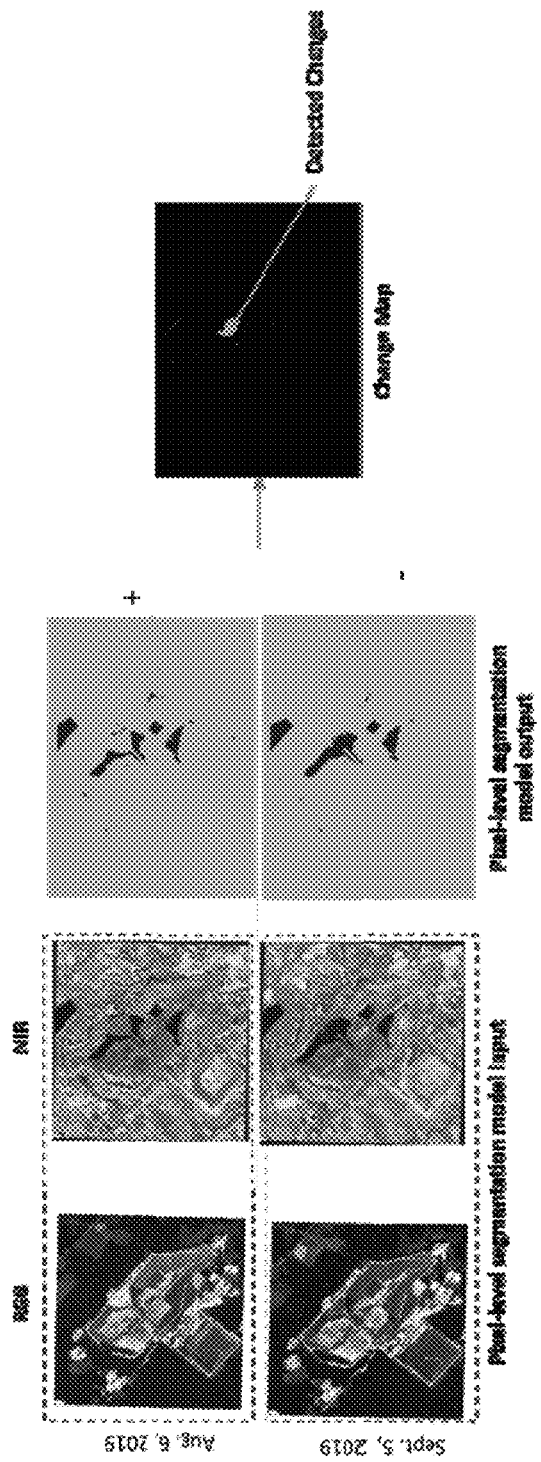
FIG. 4 is a pixel change detection model according to embodiments of the present disclosure.

In certain illustrative embodiments, the change detection model encompasses pixel-level change detection to generate the change map and event recognition to recognize landfill construction and human activity. In the case of pixel-level change detection, as the registered images are well-aligned, comparing pixel differences between detection results at different times directly produces a change map as shown in FIG. 4. Quantifying the size of this change map and analyzing the edges and corners of these alterations assist in precisely delineating the boundaries and spatial extent of the changes.

Figure 5:
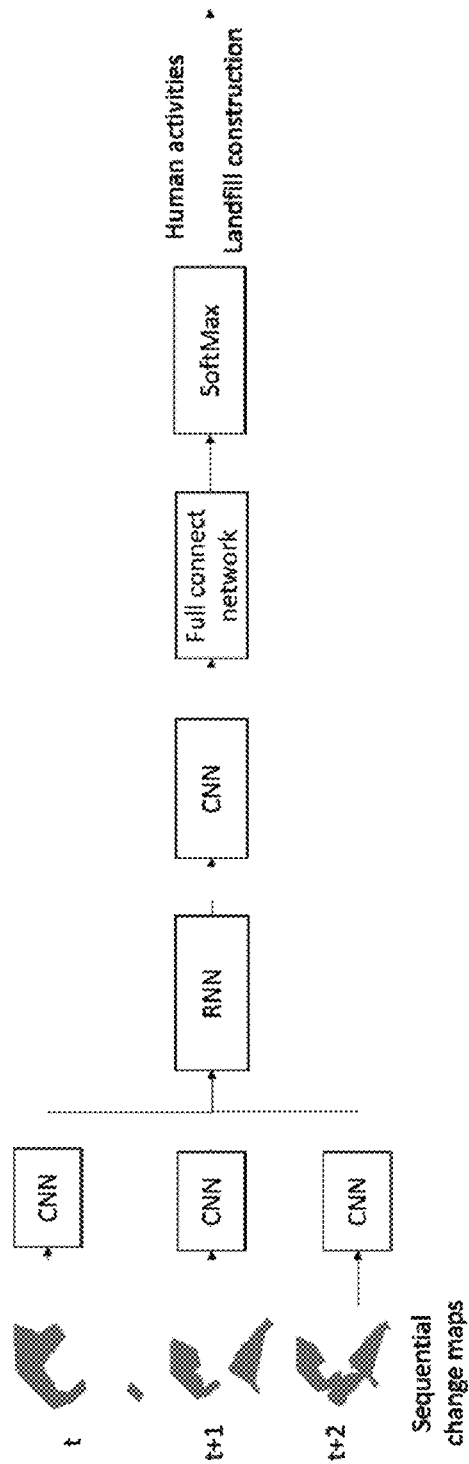
FIG. 5 is a landfill causal inference model according to embodiments of the present disclosure

The recognition of landfill construction and human activities relies on the foundation of the change map, which integrates multiple change maps into a time series dataset for detecting various construction types and identifying human activities, including landfill cover, leachate seeps, vegetation changes, slope variations, and the presence of gas wells. To accomplish this, an encoder-decoder architecture is employed. The encoder utilizes convolutional neural networks (CNNs) to extract features from each change map and feeds these sequential features into recurrent neural networks (RNNs) to generate embeddings of the change maps over time. The decoder then uses these embeddings for classifying construction types and human activities through a fully connected network combined with SoftMax as shown in FIG. 5. Alternatively, the transformer model can be used as an encoder.

Figure 6:
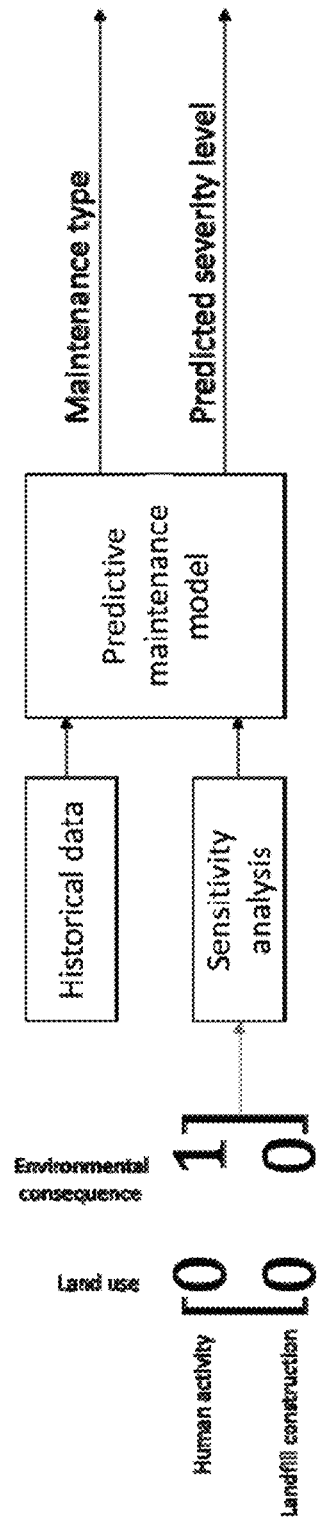
FIG. 6 is a predictive maintenance and warning model according to embodiments of the present disclosure While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

The value of time series data extends beyond mere activity detection; it encompasses understanding how sequential landfill changes or human activities impact environment and land use. For instance, analyzing the sequence of landfill changes can reveal correlations between the evolving landscape and occurrences of gas leaks or seepage events. This insight can pave the way for developing predictive models and early warning systems. A Bayesian network forms the framework for modeling the causal relationships between landfill-related environmental consequences, landfill expansion and shifts, and human activities. Using directed acyclic graphs (DAGs) for graphical representation, where nodes represent gas leaks and human activity, causality is depicted, reflecting potential causal links between these variables as shown in FIG. 5. Conditional probability distributions are incorporated into each node to quantify probabilistic associations between human activities, and their impacts on the environments and land use, providing answers to questions about the likelihood of gas leaks based on specific human activity levels and their contribution to gas leak occurrences. The network continuously refines and parameterizes as it incorporates data from various sources, such as historical gas leak records, change maps, and human activity data. It also accommodates updates to beliefs and probabilities with emerging data. Additionally, sensitivity analysis evaluates how fluctuations in human activity or landfill construction impact environment such as gas emissions, contributing to risk assessment and mitigation efforts, which serve as a valuable tool for decision-making, aiding in managing human activity in gas leak-prone areas and predicting potential gas leak incidents as shown in FIG. 6. These predictions can trigger early warnings in the event of significant changes, such as gas leaks, leachate seepages, or modifications in landfill construction.

In certain illustrative embodiments, one or more alerts can be generated by the landfill warning system based on the results of the analysis, and can be communicated through various means, including email, application notifications, or reports and dashboards, tailored to the nature and severity of the detected change and organizational preferences.

In certain illustrative embodiments, a system is provided to automatically monitor landfill operations, detect changes, recognize construction, associate human activities and landfill construction with environmental outcomes, identify root causes, and generate early warnings.

In certain illustrative embodiments, a method of monitoring landfill operations at a landfill site is provided, that can include (without limitation): obtaining first images(s) of the landfill site from one or more optical sensors; obtaining second image(s) of the landfill site from one or more optical sensors, wherein each optical sensor comprise a camera located on a satellite or a drone; aligning the first image(s) and the second image(s); segmenting the first image(s) and categorizing sections of the image(s) based on landfill characteristics, segmenting the second image(s) and categorizing sections of the image(s) based on landfill characteristics; and merging the first and second segmented images to generate a change map that identifies the location and nature of a change within the segmented landfill image. The multiple optical sensors can each comprise a camera located on a satellite, a drone, a vehicle, a robot, or a smartphone. Each image from the first set of images and the second set of images can include a plurality of image pixels, and the image pixels can be mapped to corresponding latitude and longitude geographical coordinates. At least one of the multiple optical sensors can be calibrated to correct distortion in the landfill image and convert the landfill image to corresponding coordinates. The change within the segmented landfill image can include one or more of landfill construction and human activities, landfill cover, leachate seep, vegetation change, slope variation, and the presence of a gas well. An alert can be generated based upon detected landfill constructions and human activities.

In certain illustrative embodiments, a method of recognizing human activities and landfill constructions is provided that can include (without limitation): obtaining multiple change maps across time and organizing the changes as time series data; and recognizing the human activities and landfill constructions based on the time series data.

In certain illustrative embodiments, a method of associating the human activities and landfill constructions with environmental consequences and land use is provided that can include (without limitation): obtaining human activities and landfill constructions for a given period; obtaining environmental consequence and land use for a given period; building causal relationship between human activities and landfill constructions as well as environmental consequence and land use; and determining the root causes of the environmental consequence and land use.

In certain illustrative embodiments, a method to generating early warnings is provided that can include (without limitation): obtaining the historical data of human activities and environmental consequence to establish a threshold benchmark for early warnings; obtaining causal relationship metrics between human activities as well as environmental consequence and land use; conducting sensitivity analysis on the causal relationship metrics to evaluate how fluctuations in human activity or landfill construction impact environmental consequences; and detecting the early warning events While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter.

What is claimed is:

1. A method of monitoring landfill operations at a landfill site comprising:
   obtaining a first set of images of the landfill site from at least one optical sensor, wherein the at least one optical sensor comprises a camera located on a satellite or a drone;
   obtaining a second set of images of the landfill site from at least one optical sensor, wherein the at least one optical sensor comprises a camera located on a satellite or a drone;
   aligning the first set of images and the second set of images;
   segmenting the first set of images and categorizing sections of the first set of segmented images based on landfill characteristics,
   segmenting the second set of images and categorizing sections of the second set of segmented images based on landfill characteristics, merging the first set of segmented images and the second set of segmented images; and generating a change map that identifies the location and nature of a change within the first set of segmented images and the second set of segmented images, wherein the change comprises a modification in landfill construction at the landfill site.

2. The method of claim 1, wherein the at least one optical sensor comprises a camera located on a satellite, a drone, a vehicle, a robot, or a smartphone.

3. The method of claim 1, wherein each image comprises a plurality of image pixels, and further comprising mapping the image pixels to corresponding latitude and longitude geographical coordinates.

4. The method of claim 1, further comprising calibrating the at least one optical sensor and the second optical sensor to correct distortion in the image and convert the image to corresponding coordinates.

5. The method of claim 1, further comprising generating an alert based upon detected landfill constructions and human activities.

6. A method of monitoring landfill operations at a landfill site comprising:

obtaining a first set of images of the landfill site from at least one optical sensor, wherein the at least one optical sensor comprises a camera located on a satellite or a drone;

obtaining a second set of images of the landfill site from at least one optical sensor, wherein the at least one optical sensor comprises a camera located on a satellite or a drone;

aligning the first set of images and the second set of images;

segmenting the first set of images and categorizing sections of the first set of segmented images based on landfill characteristics, segmenting the second set of images and categorizing sections of the second set of segmented images based on landfill characteristics, merging the first set of segmented images and the second set of segmented images; and generating a change map that identifies the location and nature of a change within the first set of segmented images and the second set of segmented images, wherein the change comprises a landfill cover at the landfill site.

7. A method of monitoring landfill operations at a landfill site comprising:

obtaining a first set of images of the landfill site from at least one optical sensor, wherein the at least one optical sensor comprises a camera located on a satellite or a drone;

obtaining a second set of images of the landfill site from at least one optical sensor, wherein the at least one optical sensor comprises a camera located on a satellite or a drone;

aligning the first set of images and the second set of images;

segmenting the first set of images and categorizing sections of the first set of segmented images based on landfill characteristics, segmenting the second set of images and categorizing sections of the second set of segmented images based on landfill characteristics, merging the first set of segmented images and the second set of segmented images; and generating a change map that identifies the location and nature of a change within the first set of segmented images and the second set of segmented images, wherein the change comprises leachate seep at the landfill site.

8. A method of monitoring landfill operations at a landfill site comprising:

obtaining a first set of images of the landfill site from at least one optical sensor, wherein the at least one optical sensor comprises a camera located on a satellite or a drone;

obtaining a second set of images of the landfill site from at least one optical sensor, wherein the at least one optical sensor comprises a camera located on a satellite or a drone;

aligning the first set of images and the second set of images;

segmenting the first set of images and categorizing sections of the first set of segmented images based on landfill characteristics, segmenting the second set of images and categorizing sections of the second set of segmented images based on landfill characteristics, merging the first set of segmented images and the second set of segmented images; and generating a change map that identifies the location and nature of a change within the first set of segmented images and the second set of segmented images, wherein the change comprises the presence of a gas leak at the landfill site.

9. A method of monitoring landfill operations at a landfill site comprising:

obtaining a first set of images of the landfill site from at least one optical sensor, wherein the at least one optical sensor comprises a camera located on a satellite or a drone;

obtaining a second set of images of the landfill site from at least one optical sensor, wherein the at least one optical sensor comprises a camera located on a satellite or a drone;

aligning the first set of images and the second set of images;

segmenting the first set of images and categorizing sections of the first set of segmented images based on landfill characteristics, segmenting the second set of images and categorizing sections of the second set of segmented images based on landfill characteristics, merging the first set of segmented images and the second set of segmented images; and generating a change map that identifies the location and nature of a change within the first set of segmented images and the second set of segmented images, wherein the change comprises the presence of a gas well at the landfill site.

* * * * *